H. SMITH.
Balancing Devices for Grinding-Mill.
No. 224,236.  Patented Feb. 3, 1880.
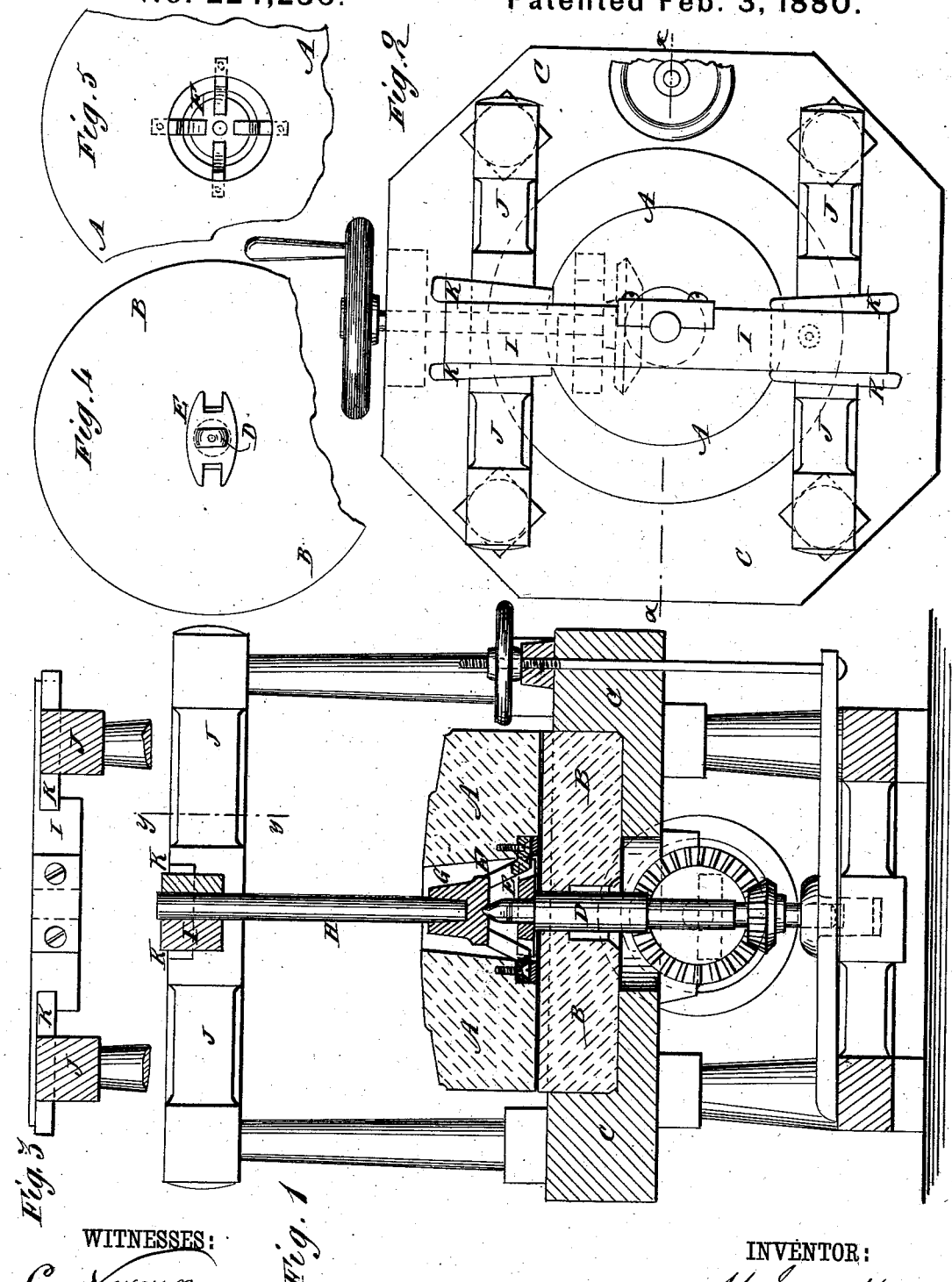
WITNESSES:
C. Neveux
C. Sedgwick
INVENTOR:
H. Smith
BY Munn & Co
ATTORNEYS.

UNITED STATES PATENT OFFICE.

HIRAM SMITH, OF HONEOYE FALLS, NEW YORK.

BALANCING DEVICE FOR GRINDING-MILLS.

SPECIFICATION forming part of Letters Patent No. 224,236, dated February 3, 1880.

Application filed April 7, 1879.

*To all whom it may concern:*

Be it known that I, HIRAM SMITH, of Honeoye Falls, in the county of Monroe and State of New York, have invented a new and useful Improvement in Millstone-Balances, of which the following is a specification.

Figure 1 is a vertical section of a run of stones to which my improvement has been applied, taken through the line $x\ x$, Fig. 2. Fig. 2 is a top view of the same. Fig. 3 is a detail section of the top frame, taken through the line $y\ y$, Fig. 1. Fig. 4 is a top view of the lower stone, showing the driver. Fig. 5 is a face view of the upper stone, showing the bail.

Similar letters of reference indicate corresponding parts.

The runner-stone in mills has been driven from above and also from below, and in some instances the revolving shaft has passed through both stones and been supported both above and below the stones. The shaft, when extending above the runner-stone, has been adjusted at the upper end.

My invention relates to the combination, with the bed and runner-stone in the mill, of a propelling or actuating spindle, a bail, a hub and socket on the bail, and an upper spindle extending to an adjustable bearing. This upper spindle has nothing to do with the driving of the mill. It simply acts as a steadying device to cause the upper millstone to run true, and it is independent of the driving-spindle, and is only connected with the bail of the runner-stone.

A represents the upper stone or runner. B represents the lower or stationary stone, and C its bed. D is the spindle, the lower end of which revolves in a step, and is driven and adjusted in the usual way. The upper end of the spindle D is flattened to fit into the slot of the driver E, and is rounded off to fit into a socket of the bail F that carries the runner A. The ends of the driver E are notched to receive the arms of the bail F. The bail F may be made with two or four arms, as may be desired.

I prefer to use a four-armed bail, as it will not become loose, as a two-armed bail is liable to do.

The arms of the bail F are secured in recesses in the stone A, and upon the upper side of its center is formed a hub, having a socket, G, to receive the lower end of the shaft H. The upper end of the shaft H revolves in bearings in a bar, I, the ends of which rest in notches in the bars J of a supporting frame-work, where it is secured in place by wedges K, driven into the said notches at the sides of the said bar I.

The shaft H and the bail F G are made sufficiently strong to hold the face of the running-stone in exactly the same place and prevent any oscillation or trembling of the runner when at work.

In using the device the runner A is lowered until its face meets and rests squarely upon the face of the lower stone, B. The shaft H is then inserted in the socket G, and the bearing-bar I is adjusted to the upper end of the said shaft, and is secured in place by the wedges K or other convenient means. With this arrangement the runner A can be freely raised and lowered to any desired extent, and the shaft H becomes a steadying device that does not interfere with the running of the stone, and if the shaft D should not be perpendicular to the face of the bed-stone the accurate running of the stone A is not influenced thereby, because it is guided by the shaft H.

I claim as my invention—

The combination, with the actuating-shaft, bail, and runner-stone in a mill, of a hub and socket on the bail, a shaft introduced into said socket and passing upwardly, and an adjustable bearing for the upper end of said shaft, substantially as and for the purposes specified.

HIRAM SMITH.

Witnesses:
EDWARD M. WHITNEY,
AARON MATHER.